Figure 1:
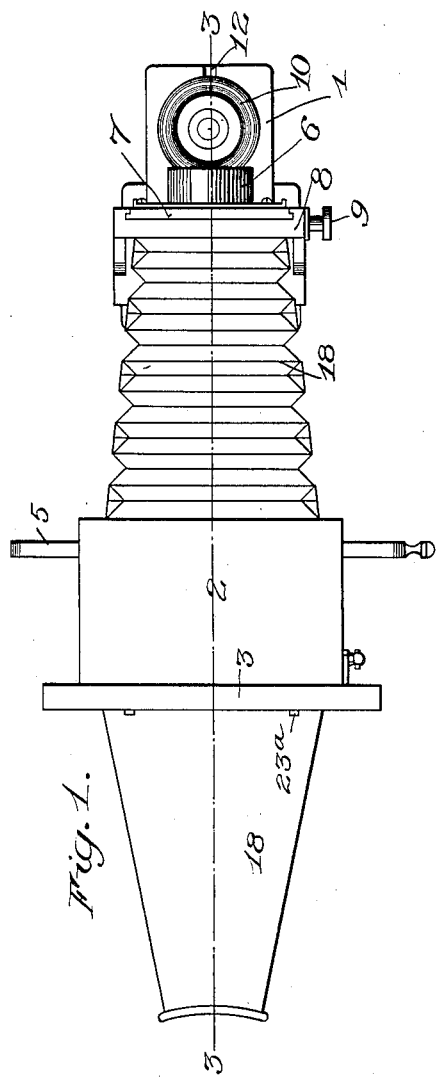

W. F. FOLMER.
PROJECTION APPARATUS.
APPLICATION FILED NOV. 2, 1907.

912,299.

Patented Feb. 16, 1909.
2 SHEETS—SHEET 1.

Witnesses

Inventor
William F. Folmer
By Church & Pick
his Attorneys

W. F. FOLMER.
PROJECTION APPARATUS.
APPLICATION FILED NOV. 2, 1907.
912,299.
Patented Feb. 16, 1909.
2 SHEETS—SHEET 2.
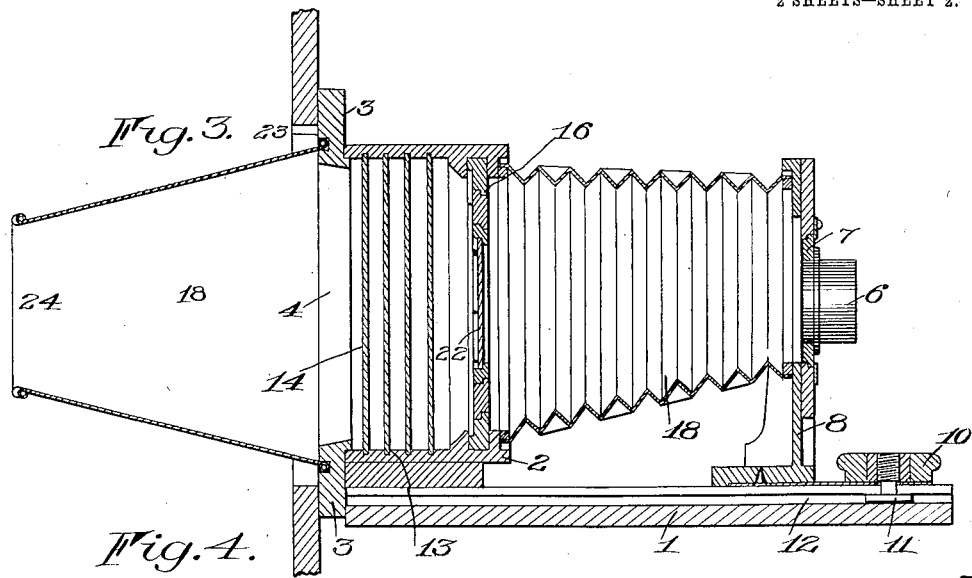
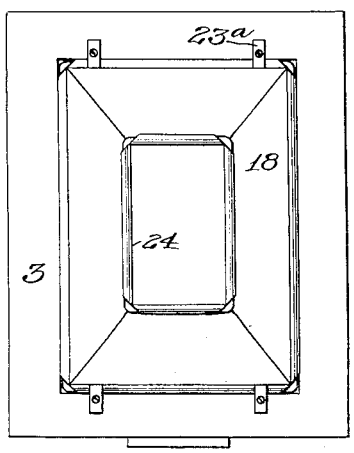
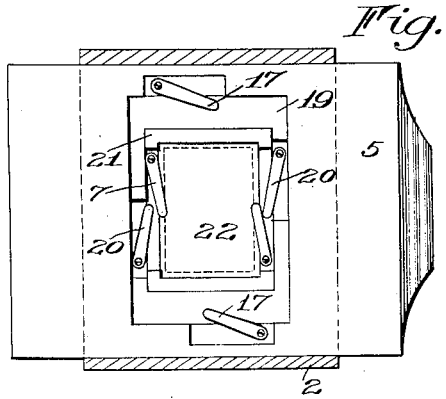
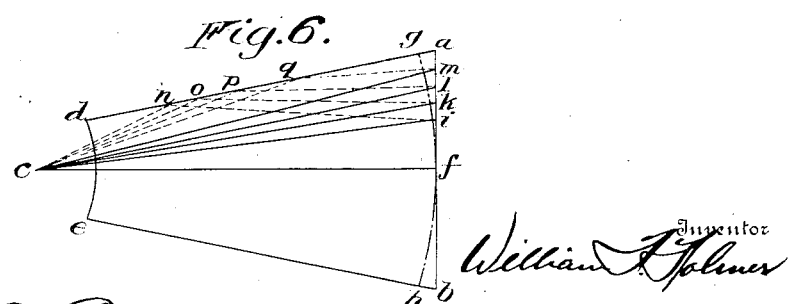
Witnesses
Walter B. Payne.
Russell B. Griffith
Inventor
William F. Folmer
By Church & Rich
his Attorneys

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

PROJECTION APPARATUS.

No. 912,299.      Specification of Letters Patent.      Patented Feb. 16, 1909.

Application filed November 2, 1907. Serial No. 400,341.

*To all whom it may concern:*

Be it known that I, WILLIAM F. FOLMER, of the city of Rochester, county of Monroe, and State of New York, have invented certain new and useful Improvements in Projection Apparatus; and I do hereby declare the following to be a full, clear, and exact description of the same, reference being had to the accompanying drawings, forming a part of this specification, and to the reference characters marked thereon.

My present invention relates to devices for producing images by means of light transmitted through the object upon a screen, usually through the medium of a lens, and, it has for its purpose to provide a cheap and efficient apparatus suitable for use in the production of enlargements from photographic negatives, the improvements being further directed particularly to providing means for uniformly distributing the light upon the object in order to obtain uniformity and exactness of reproduction of the image.

To these and other ends the invention consists in certain improvements and combinations of parts all as will be hereinafter more fully described, the novel features being pointed out in the claims at the end of the specification.

Figure 2:
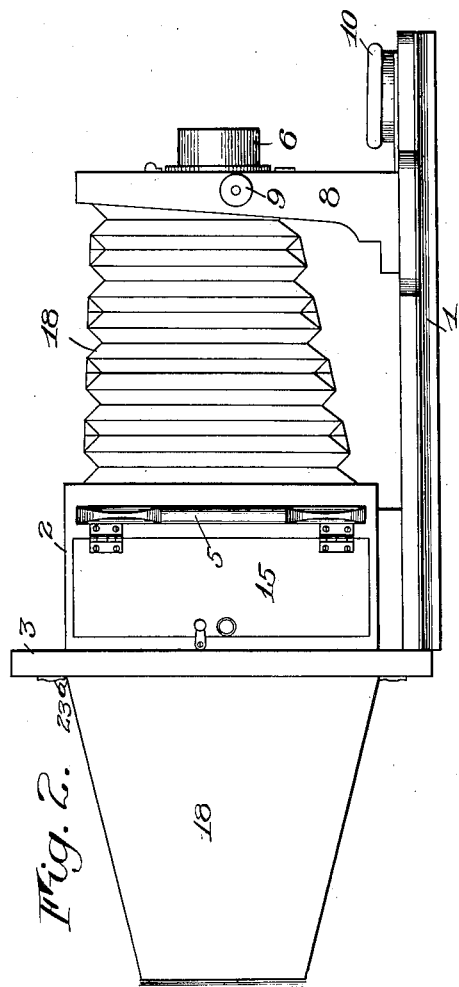

In the drawings: Figure 1 is a top plan view of a projecting apparatus constructed in accordance with my invention and showing the preferred embodiment thereof as adapted to a photographic enlarging camera. Fig. 2 is a side elevation. Fig. 3 is a longitudinal central section on the line 3—3 of Fig. 1. Fig. 4 is a rear elevation. Fig. 5 is a rear elevation of the plate or objective holder in detail, and Fig. 6 is a diagrammatic figure illustrating the paths of the light rays in traveling from their source to the object or negative.

Devices of the character indicated, particularly when fitted for photographic enlarging purposes, comprise essentially, a support or holder for the object or negative upon which a projecting lens, movable relatively thereto, is focused to receive rays transmitted through the negative from a source upon the opposite side thereof. An artificial light, such as the electric arc, is commonly employed, the rays of which are diffused by passage through one or more ground glass or opal plates interposed between it and the negative, but it has also been found necessary for accurate results to employ a condensing system as well, in order to properly distribute the rays. As a substitute for this latter, which forms a most expensive item in the make-up of the apparatus, I provide a reflecting hood in rear of the diffusion plates having an opening at its outer end for the introduction of the light, the walls of said hood and particularly the inner surfaces being so proportioned and arranged that the rays reflected therefrom will strike the diffusion plate and hence the negative at the same points as do the weaker direct marginal rays and reinforce the latter to a strength equaling the intensity of the substantially axial rays traveling a shorter distance.

Referring now to the drawings wherein similar reference characters indicate similar parts, 1 is a bed or support attached at one end to a box or body 2 and to a partition member 3 adjacent both and provided with a preferably rectangular opening 4 leading to the exterior of the body at one side of the latter, the office of said partition member being when extended, to shield the operator and the exterior adjustable parts of the apparatus from the source of light and the ill effects of its heat and intensity, as will later appear.

The body is provided upon what may be termed its lateral sides with oppositely arranged openings within which is arranged to slide freely, transversely of the bed, a removable negative holder 5, positioned opposite the opening 4 through which the light is introduced and between the source of the latter and a projecting lens indicated generally by the numeral 6. The latter may be mounted in any suitable manner to provide a focal adjustment relatively to the plane of the holder and in the present instance is arranged upon a lens board 7 adjustable vertically upon a front 8 by means of a thumb nut 9, the front in turn being slidably adjustable upon the bed 1 and secured in different positions thereon by a suitable clamping device 10 having an engaging member 11 operating in a T slot 12 in the bed. Connecting the front and body is a collapsible bellows 18 of any suitable construction and serving the usual purposes.

The top and bottom of the walls of the body 2 are provided with grooves constituting racks 13 within which are removably supported one or more diffusion plates 14 that may be made, for instance, from ground or opal glass, and are accessible for individual insertion or removal, to increase or diminish the intensity of the light passing from the opening 4 to the negative, through a door 15 at the side of the body.

The negative holder is preferably constructed as shown in Fig. 5 comprising a board 5 having a rectangular opening therein (the negatives to be introduced being usually of that shape) the edges of said opening being provided with rabbets 16 forming a seat against which the negative is inserted and retained as by the spring fingers 17. To accommodate negatives of different sizes, however, there is provided a frame 19 for the opening having complementary rabbets also fitting against the rabbets 16 and held by the fingers 17 in the same manner as a negative, but in turn provided with a rabbeted opening within which a still smaller and similarly formed frame 21 can be accommodated and with fingers 20 for holding the latter or a negative 22 and so on to any degree of reduction.

Surrounding the aperture 4 in the partition member 3, there is provided in the present instance, a continuous rectangular groove 23 within which is secured as by the buttons 23ᵃ the flanged edge of the larger end of a pyramidal reflecting hood 18 facing the opening, the walls of which hood diverge toward the latter and converge toward its opposite or rear end where they terminate at an opening 24, at which the illuminant consisting of an electric arc, mercury vapor lamp or other suitable light source is arranged. The hood may be conveniently constructed of sheet metal and provided upon its interior surface with a coat of white paint, or said surfaces may be otherwise rendered reflective. The course of the light is, therefore, through the opening 24, the opening 4, the diffusion plates 14 and negative 22 beyond which it is collected by the lens 6 and projected upon the sensitized or other recording screen placed at a proper focal distance from the lens. But both the diffusion plates and the negative being plane and the light being emanated from substantially one point the direct rays thereof alone cannot be relied upon for the purposes in hand, as they would be of unequal strength at different points upon either and produce corresponding diversity in the image. This may be clearly seen by reference to the diagram, Fig. 6, where $a$—$b$ represents the plane of the negative; $c$ the source of light; $a$—$d$ and $b$—$e$ opposite walls of the reflecting hood; $c$—$f$ an axial ray perpendicular to $a$—$b$ and $g$—$h$ an arc on the radius $c$—$f$ tangent to $a$—$b$ at $f$. The direct rays are indicated by full lines and the reflected rays by dotted lines. The direct marginal rays $c$—$i$, $c$—$k$, $c$—$l$ and $c$—$m$ striking $a$—$b$ at $i$, $k$, $l$ and $m$ respectively travel greater distances than the axial ray $c$—$f$, as they travel beyond the arc $g$—$h$, and are therefore, of course, proportionally weaker than the latter, as the squares of the distances. But the angles and general arrangement of the walls $a$—$d$ and $b$—$e$ of the hood are such that the reflected rays $c$—$n$, $c$—$o$, $c$—$p$ and $c$—$q$ incident at $n$; $o$, $p$ and $q$ are also reflected to $i$, $k$, $l$ and $m$, that is, to points remote from $f$ and reinforce the direct marginal rays to the degree of intensity of the axial rays with the result that the light force at all points on $a$—$b$, that is, the negative, is uniform and the rays collected by the lens vary only as they are individually resisted by actual passage through the negative. The well known office of the diffusion plates being simply to disperse the rays in all directions, their interposition is consistent with the foregoing results. Were the provisions for marginal reinforcement not provided, the clouded or darkened effects upon these plates would be communicated to the negative.

As before mentioned, the usual and most practical shape of the negatives being rectangular, it is advisable in order to utilize all of the light emitted, that the field of illumination be made to correspond. I therefore preferably construct the hood with plane walls and rectangular in cross section, the dimensions of its section, being the same in their relative proportions to the corresponding dimensions of the seats in the object or negative holder.

It will be found convenient to extend the partition member 3 by securing the portions thereof, which project beyond the body and other parts of the apparatus to a wall or barrier as by screws extending through the aperture 25, the said wall being provided with an opening through which the hood projects. The necessarily accessible portions of the apparatus and the operator himself are then protected from the light and heat and the sensitized recording sheets may be more conveniently and safely handled.

I claim as my invention:

1. In a projection apparatus, the combination with an object holder, of a reflecting hood rectangular in cross section having plane walls diverging toward the plane of the holder and converging toward an opening at the opposite end through which light can be admitted to illumine an object arranged in the holder.

2. In a projection apparatus, the combination with an object holder having a rectangular seat therein for the reception of an object of similar shape, of a pyramidal reflecting hood having its walls diverging toward the plane of the holder and converging toward an opening at the opposite end, said hood having cross sectional dimensions of the same relative proportions as the corresponding dimensions of the seat in the object holder.

3. In a projection apparatus, the combination with a support, a diffusion plate and lens mounted thereon and an object holder arranged between the latter, of a reflecting hood carried by the support having walls diverging toward the plane of the diffusion plate and converging toward an opening at its opposite end through which light can be admitted to illumine an object arranged in the holder.

4. In a projection apparatus, the combination with a body having a light admission opening at one end thereof, and a light projecting element at the other and an object holder arranged between said opening and projecting element, of a plate rack contained within the body, and a removable diffusion plate supported in said rack between the object holder and light admission opening and accessible through a door opening at the side of the body.

5. In a projection apparatus, the combination with a body having a light admission opening at one end thereof and a light projecting element at the other, of an object holder arranged between said opening and projecting element and comprising a board having an opening therein, a removable frame seated in said opening, means for securing the frame in position and means for retaining an object in the frame.

WILLIAM F. FOLMER.

Witnesses:
H. H. SIMMS,
RUSSELL B. GRIFFITH.